(12) United States Patent
Taniguchi

(10) Patent No.: US 10,252,643 B2
(45) Date of Patent: Apr. 9, 2019

(54) SEAT SLIDING DEVICE

(71) Applicant: TOYOTA BOSHOKU KABUSHIKI KAISHA, Aichi (JP)

(72) Inventor: Kosuke Taniguchi, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 0 days.

(21) Appl. No.: 15/912,854

(22) Filed: Mar. 6, 2018

(65) Prior Publication Data
US 2018/0257515 A1 Sep. 13, 2018

(30) Foreign Application Priority Data

Mar. 7, 2017 (JP) .................................. 2017-042757

(51) Int. Cl.
*B60N 2/08* (2006.01)
*B60N 2/07* (2006.01)

(52) U.S. Cl.
CPC ......... *B60N 2/0818* (2013.01); *B60N 2/0705* (2013.01)

(58) Field of Classification Search
CPC .. B60N 2/0722; B60N 2/0818; B60N 2/0705; B60N 2/0727; B60N 2/0831; B60N 2304/01; B60N 2304/03; B60N 2/0843; B60N 2/0715; B60N 2/067; B60N 2/02; B60N 2/04; B60N 2/06; B60N 2/01508; B60N 2/01516; B60N 2/08; B60N 2/0806; B60N 2/0825; B60N 2/085; B60N 2/0837; B60N 2/075
USPC ............. 248/424, 425, 429, 430; 269/65.13, 269/65.14, 65.15
See application file for complete search history.

(56) References Cited

U.S. PATENT DOCUMENTS

| | | | | |
|---|---|---|---|---|
| 8,616,515 | B2 * | 12/2013 | Hayashi ............... | B60N 2/0705 248/424 |
| 9,150,125 | B2 * | 10/2015 | Hayashi ............... | B60N 2/0705 |
| 9,827,878 | B1 * | 11/2017 | Matsufuji ............... | B60N 2/07 |
| 2004/0188586 | A1 * | 9/2004 | Jaudouin ................. | B60N 2/08 248/429 |
| 2004/0232750 | A1 * | 11/2004 | Rohee ...................... | B60N 2/08 297/334 |
| 2009/0289485 | A1 * | 11/2009 | Walter ................. | B60N 2/0705 297/344.1 |
| 2013/0168524 | A1 * | 7/2013 | Aoi ...................... | B60N 2/0705 248/430 |
| 2013/0264454 | A1 * | 10/2013 | Hayashi ............... | B60N 2/0705 248/429 |
| 2015/0069202 | A1 | 3/2015 | Hayashi | |
| 2015/0090853 | A1 * | 4/2015 | Arakawa ............. | B60N 2/0705 248/429 |
| 2015/0090854 | A1 * | 4/2015 | Hayashi ............... | B60N 2/0705 248/429 |

(Continued)

FOREIGN PATENT DOCUMENTS

JP 2014-84009 5/2014

*Primary Examiner* — Muhammad Ijaz
(74) *Attorney, Agent, or Firm* — Greenblum & Bernstein, P.L.C.

(57) ABSTRACT

Provided is a seat sliding device that includes a fixed rail, a movable rail, a first latch, a second latch, and a third latch. The first latch serves as a main lock. The second latch is positioned a distance from the first latch along a longitudinal axis of the fixed rail, and the third latch is positioned a distance from the first latch along the longitudinal axis.

6 Claims, 11 Drawing Sheets

(56) References Cited

U.S. PATENT DOCUMENTS

| | | | |
|---|---|---|---|
| 2015/0217661 A1* | 8/2015 | Takiya | B60N 2/075 248/429 |
| 2015/0306981 A1* | 10/2015 | Arakawa | B60N 2/0705 248/429 |
| 2016/0221477 A1* | 8/2016 | Satoh | B60N 2/0837 |
| 2017/0341534 A1* | 11/2017 | Taniguchi | B60N 2/0881 |
| 2017/0341535 A1* | 11/2017 | Taniguchi | B60N 2/0881 |
| 2018/0009337 A1* | 1/2018 | Kimura | B60N 2/0715 |
| 2018/0022236 A1* | 1/2018 | Taniguchi | B60N 2/0705 297/344.11 |
| 2018/0201161 A1* | 7/2018 | Goto | B60N 2/123 |

* cited by examiner

SEAT SLIDING DEVICE

CROSS-REFERENCE TO RELATED APPLICATIONS

This international application claims benefit of Japanese Patent Application No. 2017-042757 filed on Mar. 7, 2017 with the Japan Patent Office, the entire disclosure of which is incorporated herein by reference.

BACKGROUND

The present disclosure relates to a seat sliding device that supports a seat in a slidable manner.

For example, a seat sliding device disclosed in Japanese Unexamined Patent Application No. 2014-84009 comprises a fixed rail that includes locking grooves, a movable rail that comprises restriction grooves, and a lock spring that comprises locking pieces that engages locking grooves with restriction grooves.

SUMMARY

In the invention disclosed in Patent Document 1, the locking pieces that configure a latch are engaged together with the lock grooves and the restriction grooves.

In one aspect of the present disclosure, it is desirable to provide a seat sliding device that can enhance a lock strength and realize reduction in weight of the seat sliding device.

With the enhanced lock strength, a locking state can be maintained in which the movable rail is engaged with the fixed rail in response to an external force significantly acting on the movable rail.

In the present disclosure, the seat sliding device comprises: a fixed rail that comprises indentations that are indented along axes substantially perpendicular to a longitudinal axis of the fixed rail, the indentations being arranged in an aligned manner along the longitudinal axis; a movable rail that is slidable with respect to the fixed rail while supporting a seat, the movable rail comprising through-holes that extend through axes perpendicular to indentation axes of the indentations and the longitudinal axis and the through-holes being arranged in an alignment manner along the longitudinal axis; a first latch; a second latch; and a third latch.

The first latch gets through a first through-hole among the through-holes and gets through respective indentations among the indentations. The first latch is then displaced along the indentation axes, thereby being displaceable between a locking position that provides engagements with the respective indentations and a non-locking position that is distanced from the locking position.

The second latch gets through a second through-hole among the through-holes and gets through respective indentations among the indentations. The second latch is then displaced along the indentation axes, thereby being displaceable between the locking position that provides engagements with the respective indentations and the non-locking position that is distanced from the locking position.

The third latch gets through a third through-hole among the through-holes and gets through respective indentations among the indentations. The third latch is then displaced along the indentation axes, thereby being displaceable between the locking position that provides engagements with the respective indentations and the non-locking position that is distanced from the locking position.

With such a configuration, the first latch to the third latch in the present disclosure respectively get through the first through-hole to the third through-hole and get through the respective indentations, and thus the movable rail is engaged with the fixed rail via three portions and more. Thus, it is possible to enhance the lock strength.

The external force that is directed to slide the movable rail is distributed to the first latch to the third latch, thus minimizing respective forces that act on the first latch to the third latch and on the indentations in comparison with the external force acting on the movable rail.

Thus, it is possible to reduce thicknesses of respective portions that configure the first latch to the third latch and the indentations and thereby to reduce a weight of the seat sliding device.

In the present disclosure, the first latch serves as a main lock that withstands loads, in greater amount in comparison with the second latch and the third latch, in response to an external force that displaces the movable rail along the longitudinal axis acting thereon while in the locking state.

With such a configuration, the external force that acts on the movable rail causes the first latch to abut with pressure against inner wall surfaces of the respective indentation in a tightening manner. Hereinafter, portions against which the first latch abuts with pressure are referred to as first pressure-abutting portions.

The first latch and the movable rail are slightly deformed, which causes the second latch and the third latch to have a moment about the first-pressure abutting portions. The moment is induced in a direction that releases the second latch and the third latch from respective indentations. Hereinafter, the moment is referred to as a release moment.

The release moment therefore increases as respective distances increases between the first pressure-abutting portions and the second latch and further to the third latch. Accordingly, the second latch or the third latch may not exhibit a function thereof in response to a significant external force, thus being unable to effectively enhance the lock strength.

In the present disclosure, however, the second through-hole and the second latch are respectively positioned in an end in the longitudinal axis respective distances from the first through-hole and the first latch, and third through-hole and the third latch are respectively positioned in another end in the longitudinal axis respective distances from the first through-hole and the first latch.

With such a configuration, it is possible to reduce the distance between the first pressure-abutting portions and the second latch or the distance between the first pressure-abutting portions and the third latch in comparison with an example configuration where the second latch and the third latch are together positioned in an end in the longitudinal axis a distance from the first latch.

Thus, it is possible to reduce the release moment and thereby to effectively exhibit respective functions of all of the first latch, the second latch, and the third latch, which ensures to enhance the lock strength.

In the present disclosure, the seat sliding device may be configured as follows.

Preferably, in absence of the external force acting on the movable rail in the locking state, the first latch abuts against the inner wall surfaces of the respective indentations or an inner wall surface of the first through-hole. The second latch is separated at least from the inner wall surfaces of the respective indentations or an inner wall surface of the second through-hole. The third latch is separated at least from the inner wall surfaces of the respective indentations or an inner wall surface of the third through-hole.

With such a configuration, it is possible to ensure that the first latch serves as the main lock.

Preferably, in the above configuration, the first latch at least abuts against the inner wall surfaces of the respective indentations; the second latch is separated from the inner wall surfaces of the respective indentations and from the inner wall surface of the second through-hole; and the third latch is separated from the inner wall surfaces of the respective indentations and from the inner wall surface of the third through-hole.

The second latch and the third latch are likely to be released from the respective indentations due to the aforementioned release moment where the first latch, the second latch, and the third latch each is configured with a linear material having a circular section.

In the present disclosure, however, the aforementioned effects help the second latch and the third latch to be unlikely released from the respective indentations.

Preferably, the first latch, the second latch, and the third latch are configured integrally as one piece with single linear material that is processed into a series of square waves.

Preferably, the indentations have respective widths that flare toward respective opened-ends of the indentations. With such a configuration, it is possible to easily guide the first latch, the second latch, and the third latch into the respective indentations.

The release moment may be easily induced where the indentations have the respective widths that flare toward the respective opened-ends of the respective indentations. In the present disclosure, however, the aforementioned effects help the second latch and the third latch to be unlikely released from the respective indentations.

BRIEF DESCRIPTION OF THE DRAWINGS

An embodiment of the present disclosure will be described by way of example with reference to the accompanying drawings, in which.

DETAILED DESCRIPTION OF THE PREFERRED EMBODIMENTS

"Embodiments" to be described below are example embodiments within the technical scope of the present disclosure. In other words, invention-specifying-matters and so on recited in accompanying claims are not limited to specific configurations, structures, and the like, shown in the below-described embodiments.

Arrows and other marks that indicate directions labelled on each drawing are made for easy understanding of relationships between each drawing. The present disclosure is not limited to the directions labelled on each drawing.

Figure 1:
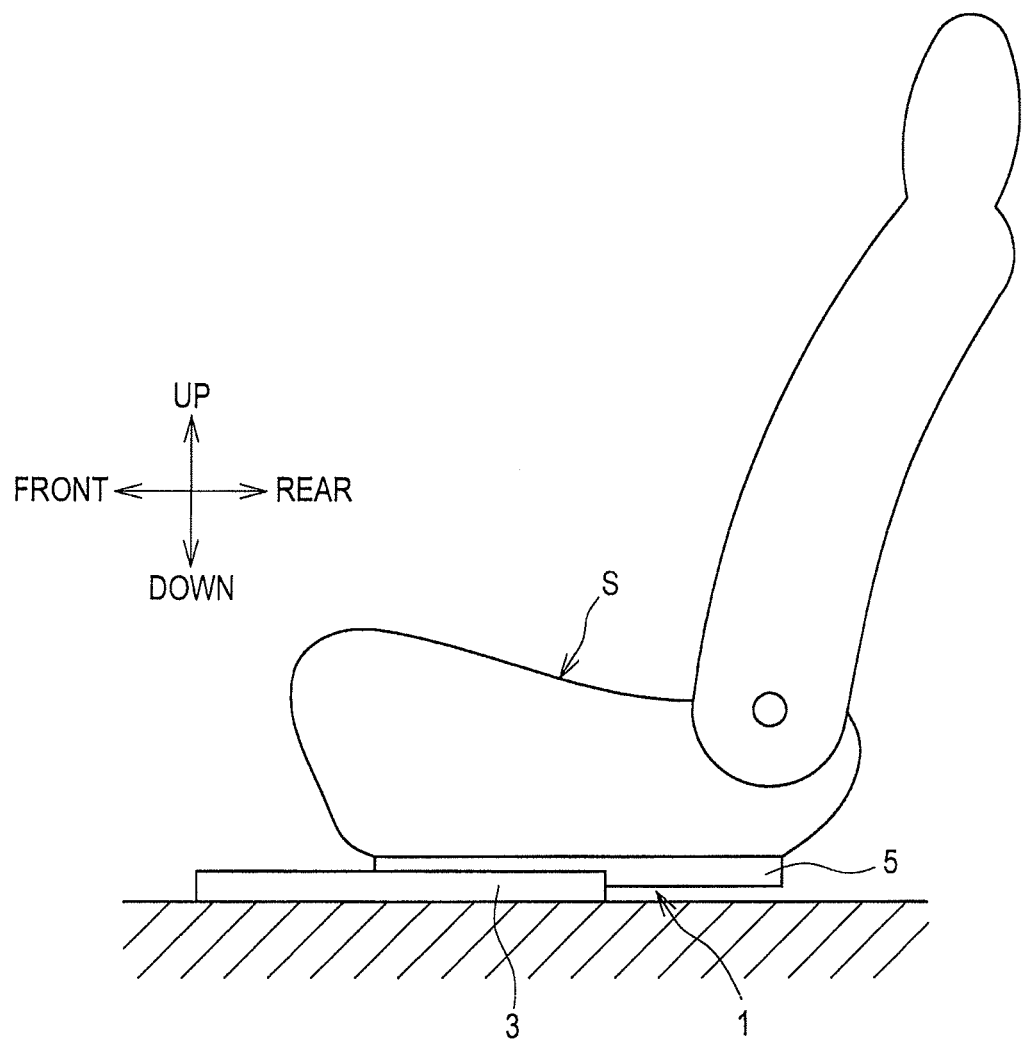
FIG. 1 is a schematic view of a vehicle seat.

As shown in FIG. 1, a seat sliding device 1 according to the present embodiment is provided to a vertical-axis lower end of a seat S.

The seat sliding device 1 according to the present embodiment is arranged in each side along a seat-width axis of the seat S. Specifically, the seat S is mounted onto a vehicle via the two seat sliding devices 1. The width axis of the seat S corresponds to a vehicle width axis, which is a vehicle left-right axis.

1. Overview of Seat Sliding Device

Figure 2:
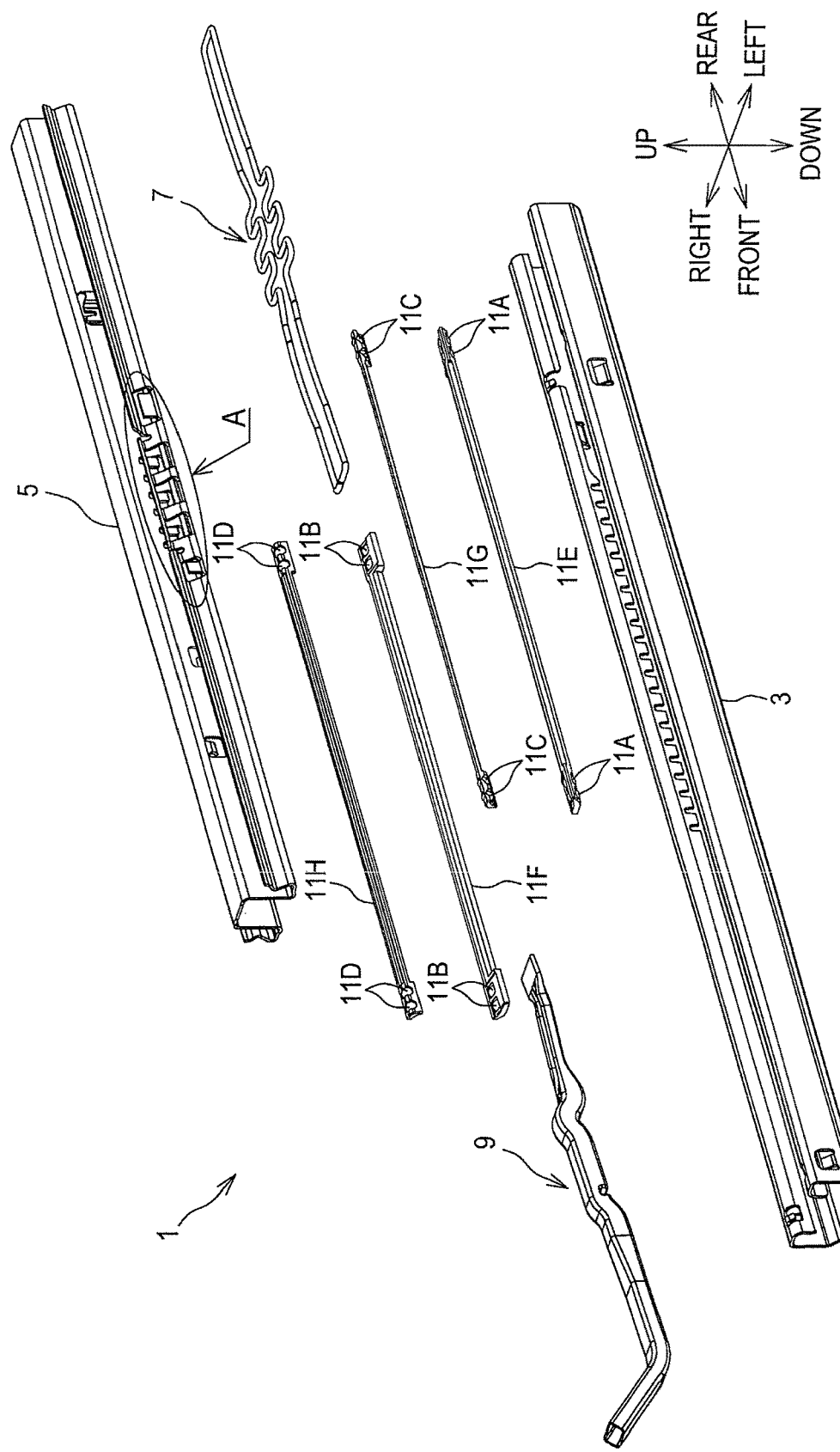
FIG. 2 is an exploded perspective view of a seat sliding device.

Hereinafter, a description is given of a seat sliding device 1. As shown in FIG. 2, the seat sliding device 1 comprises a fixed rail 3, a movable rail 5, a lock spring 7, and a releasing member 9. As shown in FIG. 1, the fixed rail 3 is secured to a floor panel or the like of the vehicle such that a longitudinal axis of the fixed rail 3 corresponds to a front-rear axis of the vehicle (a front-rear axis of the seat).

Figure 3:
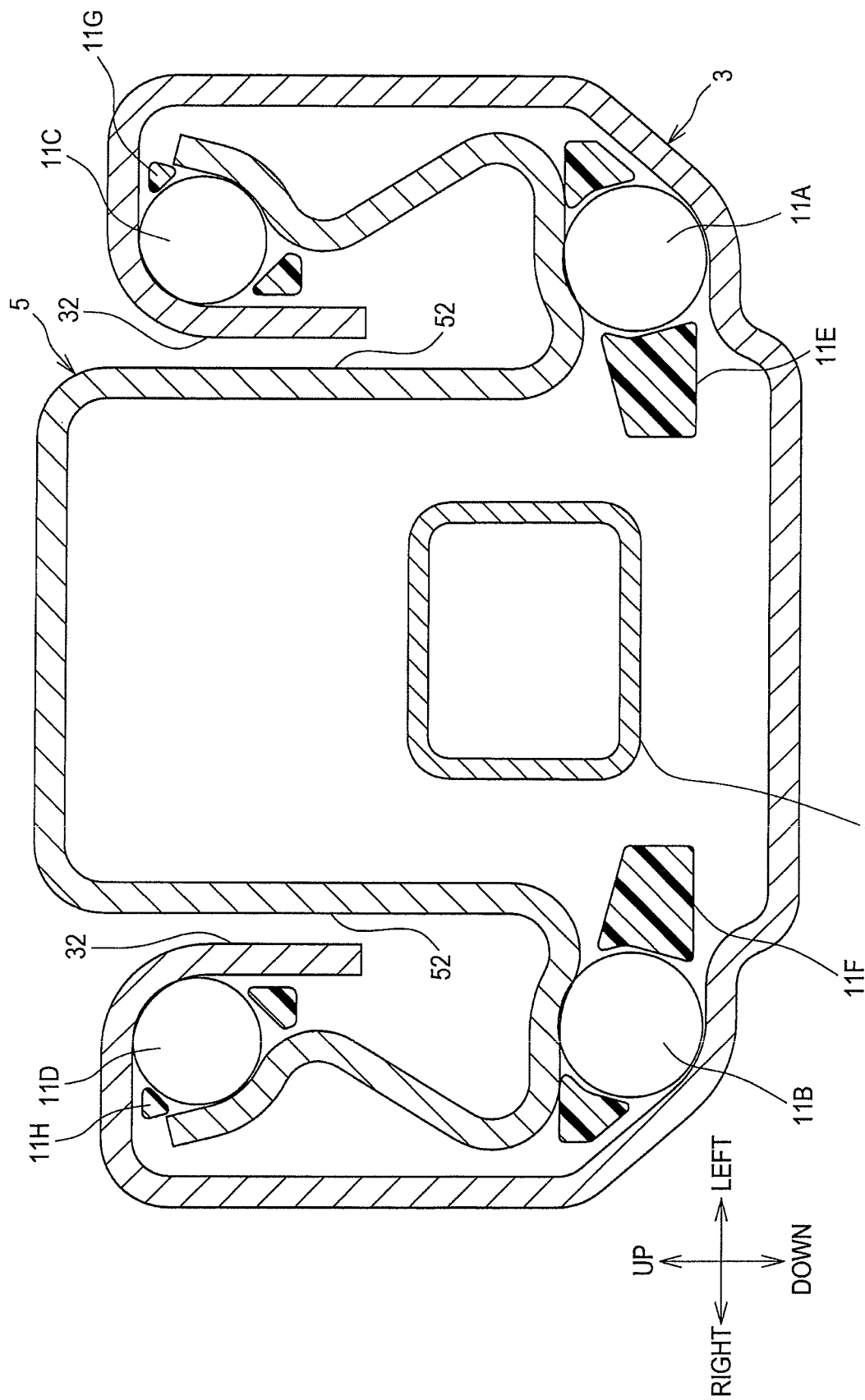
FIG. 3 is a sectional view of the seat sliding device.

The movable rail 5 supports the seat S and is slidable with respect to the fixed rail 3. As shown in FIG. 3, the movable rail 5 is supported by the fixed rail 3 via rolling elements 11A to 11D.

The rolling elements 11A to 11D are in rolling contact with the fixed rail 3 and the movable rail 5. This allows the movable rail 5 to be slidingly displaced along the longitudinal axis (the front-rear axis) of the fixed rail 3 while having a restriction on displacement with respect to the fixed rail 3 along a seat width axis (right-left directions, hereinafter simply referred to as a width axis).

The rolling elements 11A to 11D are spheres, such as a steel ball or the like. A shown in FIG. 2, each of the rolling elements 11A to 11D is respectively retained by retainers 11E to 11H. Each of the rolling elements 11A to 11D is two in number for each longitudinal end of retainers 11E to 11H.

The lock spring 7 restricts the movable rail 5 from sliding with respect to the fixed rail 3. The releasing member 9 releases the restraint by the lock spring 7. The releasing member 9 is operated directly or indirectly by a passenger or other person.

2. Lock Mechanism 2.1 Overview of Lock Mechanism

Figure 4:
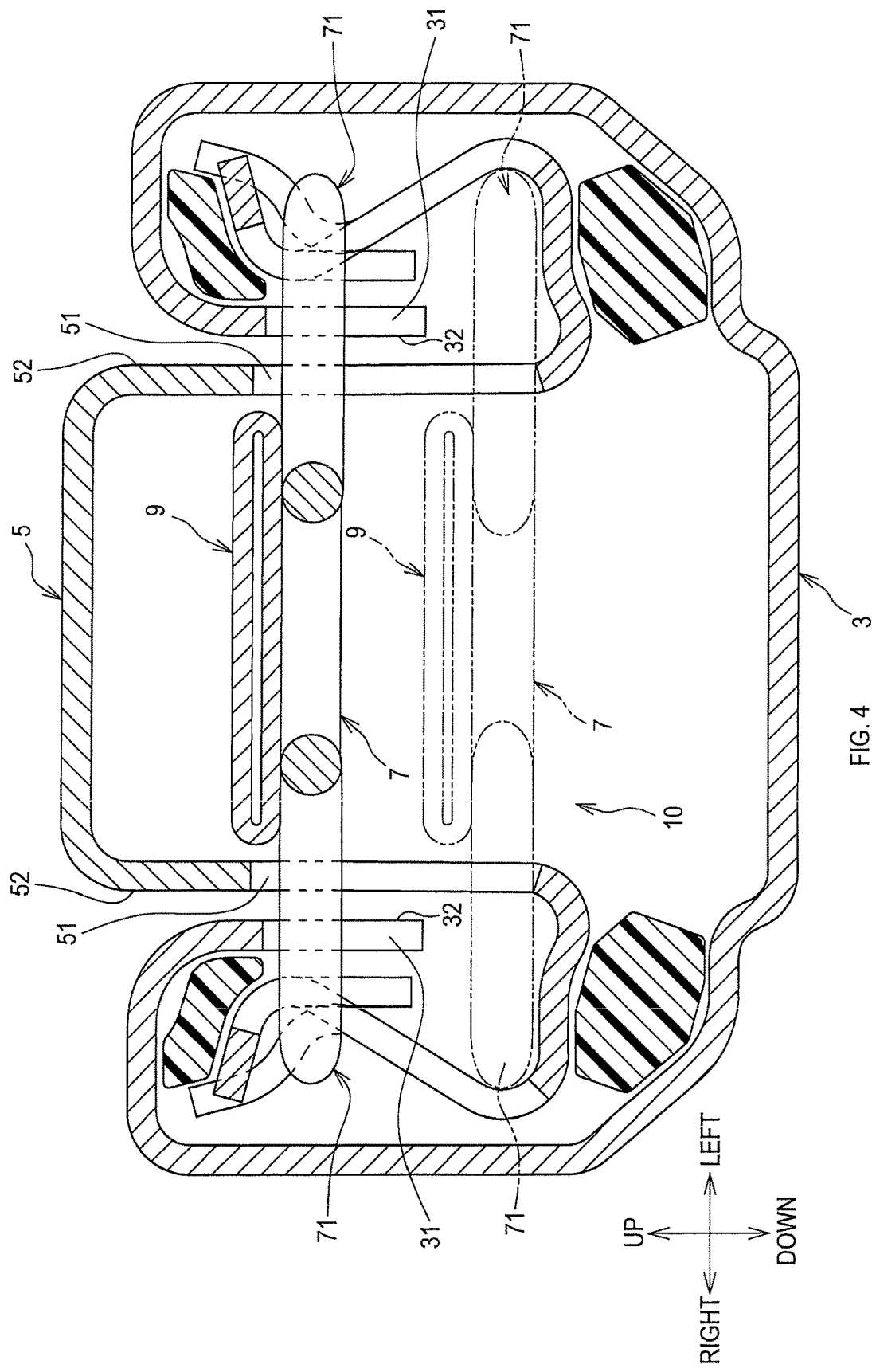
FIG. 4 is a sectional view of the seat sliding device.

The seat sliding device 1 comprises a locking mechanism 10 (see, FIG. 4). The locking mechanism 10 prevents sliding displacement of the movable rail 5. As shown in FIG. 4, the locking mechanism 10 comprises the lock spring 7 and the releasing member 9.

Figure 5:
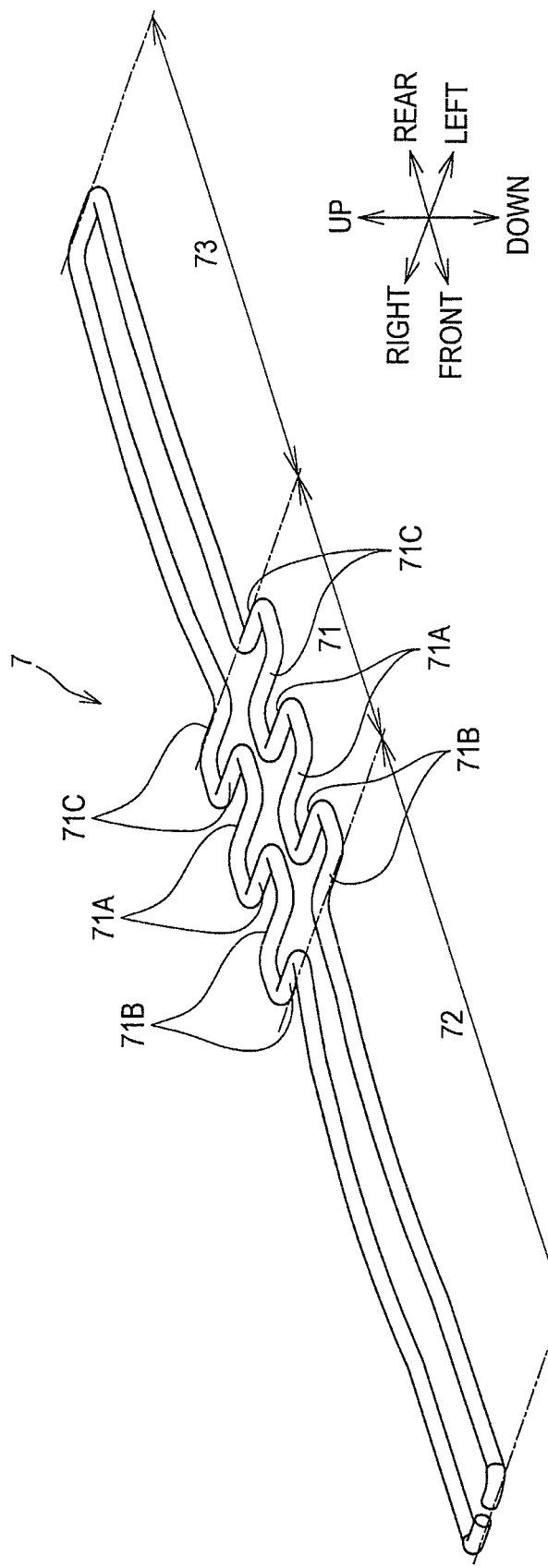
FIG. 5 is a perspective view of a lock spring.

In FIG. 5, the lock spring 7 comprises a lock portion 71, a first spring portion 72, and a second spring portion 73. The lock portion 71 may releasably engage with the fixed rail 3 and with the movable rail 5 in a catching manner.

Figure 6:
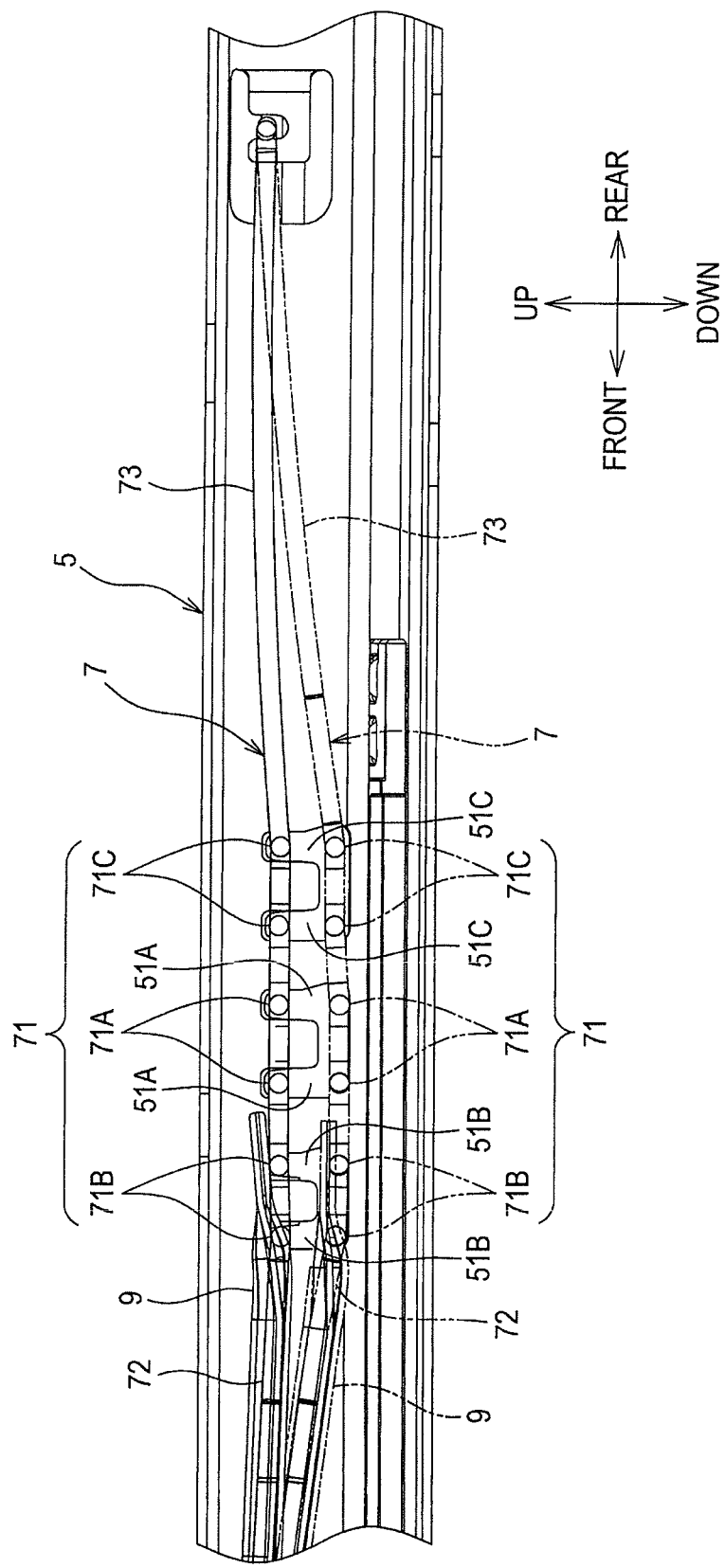
FIG. 6 is an explanatory diagram of an operation of a locking mechanism.

The first spring portion 72 and the second spring portion 73 are elastically deformable, and support the lock portion 71 such that the lock portion 71 is vertically displaceable. As indicated by solid lines in FIG. 6, the first spring portion 72 and the second spring portion 73 maintain the engagement between the lock portion 71 and fixed rail 3, and the engagement between the lock portion 71 and the movable rail 5.

An operation of the releasing member 9 by the passenger and the like generates an operation force, which elastically deforms the first spring portion 72 and the second spring portion 73. Downward movement of lock portion 71 releases the engagement between the lock portion 71 and the fixed rail 3, and releases the engagement between the lock portion 71 and the movable rail 5 as indicated by double-dot chain lines in FIG. 6.

When the operation force no longer acts on the releasing member 9, the first spring portion 72 and the second spring portion 73 are restored back to respective original shapes. As a result, the lock portion 71 returns to a position (as indicated by the solid lines in FIG. 6) that provides the engagement with the fixed rail 3 and with the movable rail 5.

The lock spring 7 according to the present embodiment is configured with a linear metal article having toughness, such as a spring steel or the like, that is processed by bending. The first spring portion 72, the lock portion 71, and the second spring portion 73 are formed as a metal-made integral piece.

2.2 Structure in which Lock Portion is Engaged with Fixed Rail and Movable Rail

As shown in FIGS. 3 to 5, the lock portion 71 (the lock spring 7), the fixed rail 3 and the movable rail 5 are bilaterally symmetric. Hereinafter a description will be given of an engagement structure on one end side (on the right end side in the present embodiment).

<Fixed Rail and Movable Rail>

Figure 7:
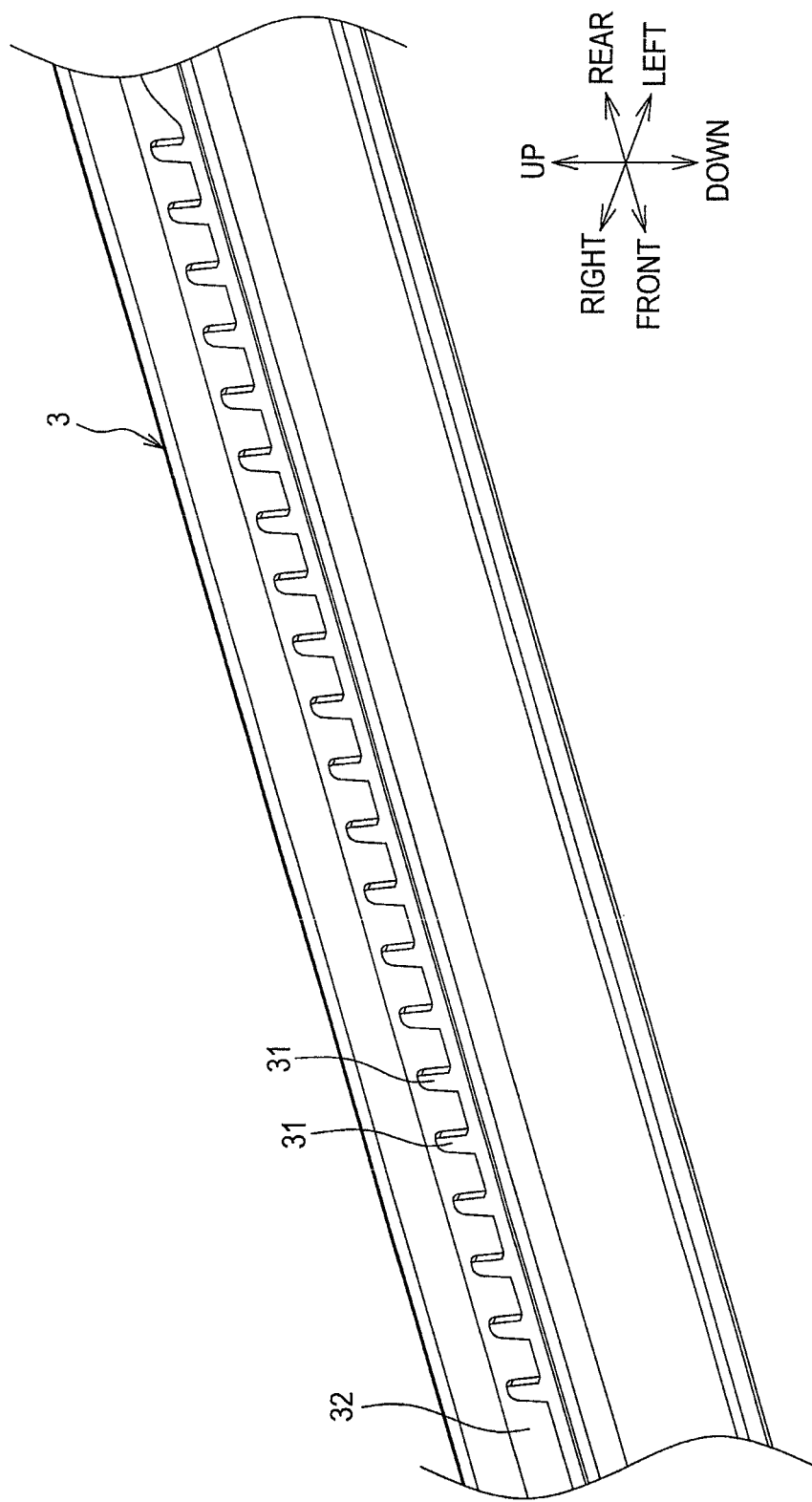
FIG. 7 is a partially enlarged view of a fixed rail.

As shown in FIG. 7, the fixed rail 3 comprises a plate 32 that faces the movable rail 5, and indentations 31 are arranged in the plate 32. Each indentation 31 is indented along an axis (an up-down axis in the present embodiment) substantially perpendicular to the longitudinal axis of the fixed rail 3.

In a longitudinal middle part of the fixed rail 3, the indentations 31 are arranged in an aligned manner along the longitudinal axis. The longitudinal middle part is a part between one longitudinal-axis end and the other longitudinal-axis end.

Figure 8:
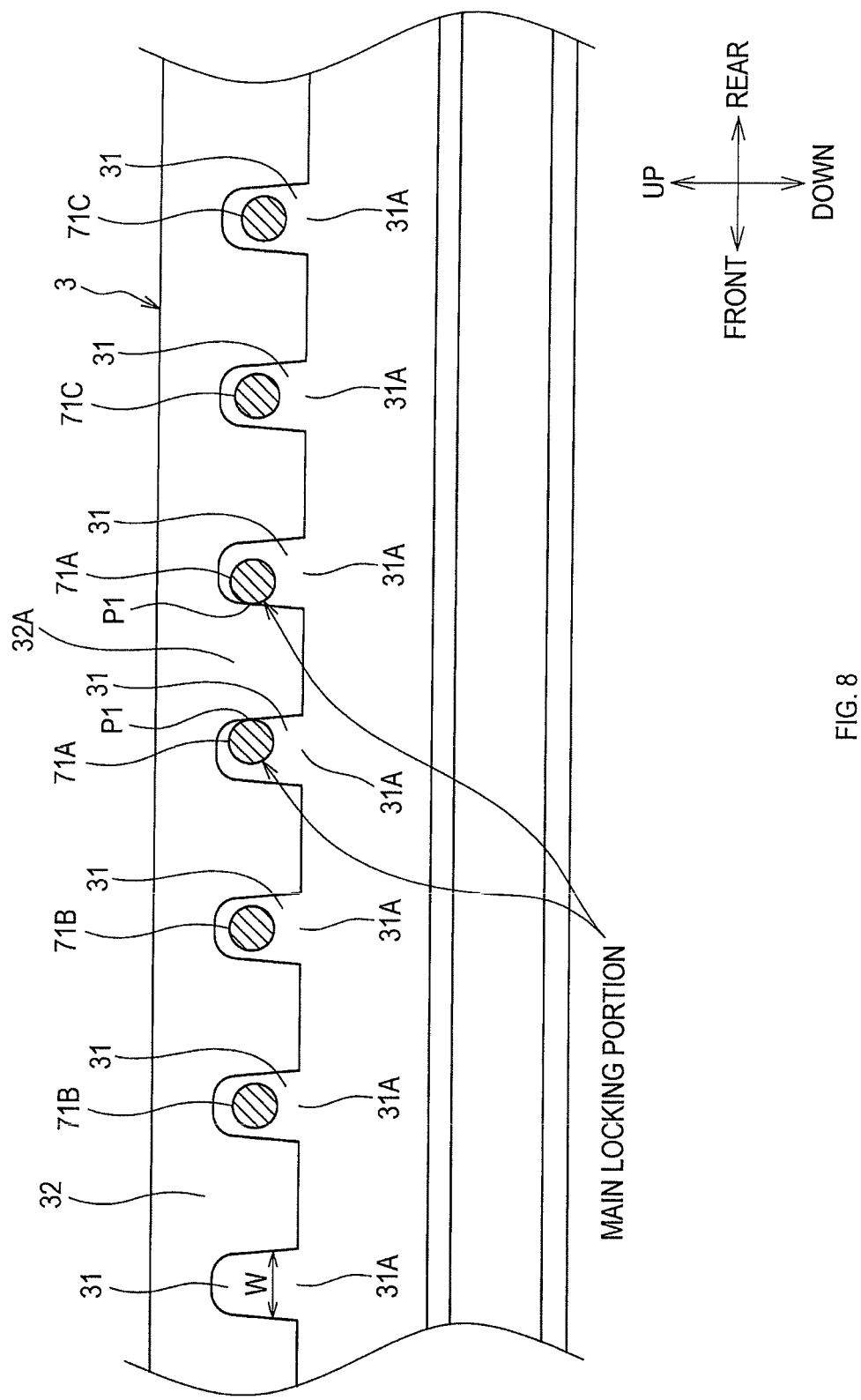
FIG. 8 is an enlarged view of indentations.

As shown in FIG. 8, each indentation 31 is formed in a substantially U-shape so as to hollow out the fixed rail 3 along the width axis (the left-right axis).

The indentation 31 has a width W that flares toward an opened-end 31A of the indentation 31. The width W of the indentation 31 is parallel to the longitudinal axis, which is the front-rear axis.

From the opened-end 31A, the indentation 31 is formed in the substantially U-shape. In other words, the indentation 31 according to the present embodiment is configured in a hollowed manner to have the substantially U-shape that flares toward the opened-end 31A from a rear end of the indentation 31.

As shown in FIG. 4, the movable rail 5 has a plate 52, and through-holes 51 are arranged in the plate 52. Each through-hole 51 extends through the plate 52 along an axis substantially perpendicular to an indentation axis of the indentation 31 and to the longitudinal axis. The plate 52 is a portion in the movable rail 5 that faces the indentation 31 (the plate portion 32).

Figure 9:
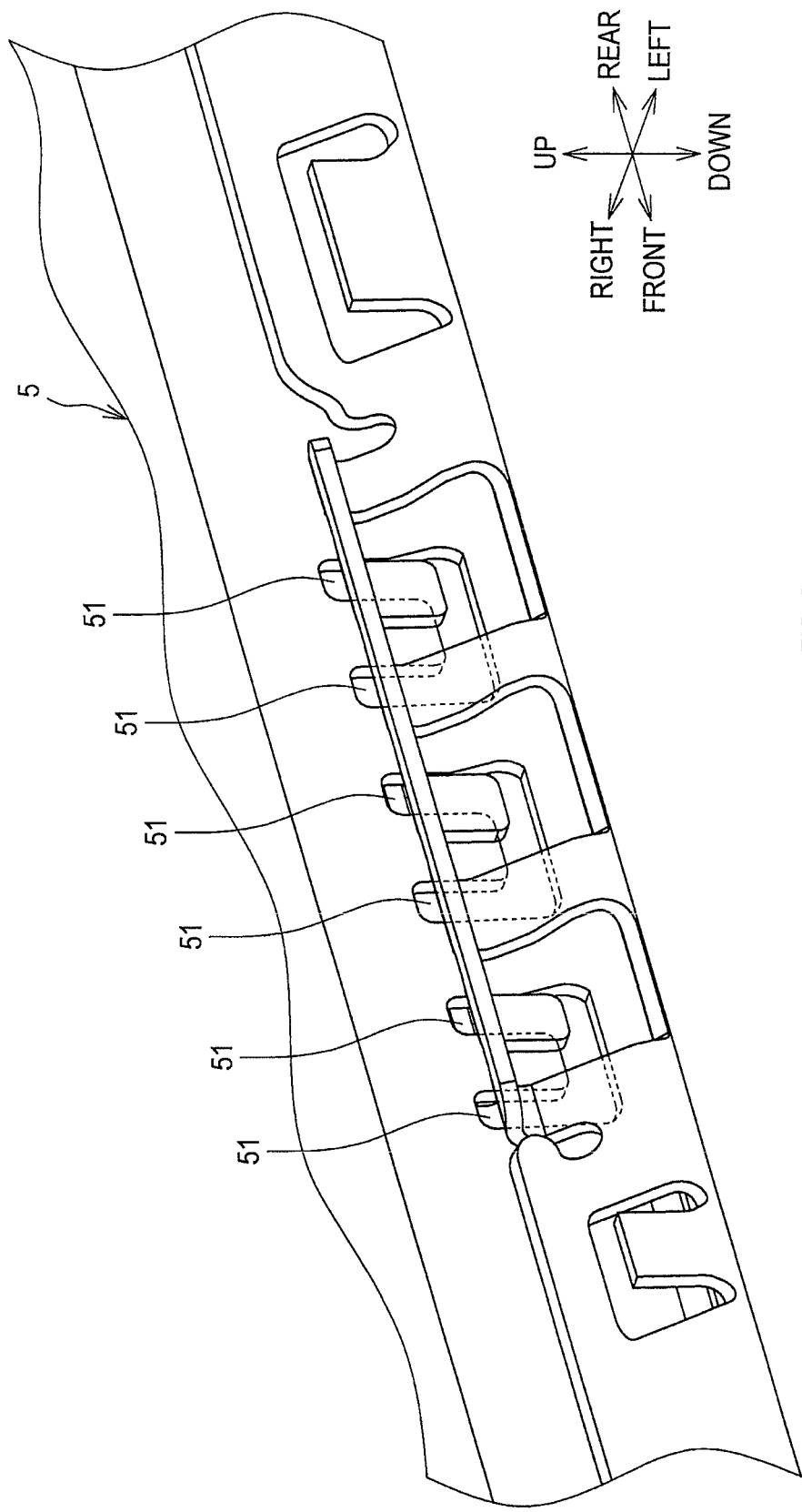
FIG. 9 is a partially enlarged view of a movable rail.
Figure 10:
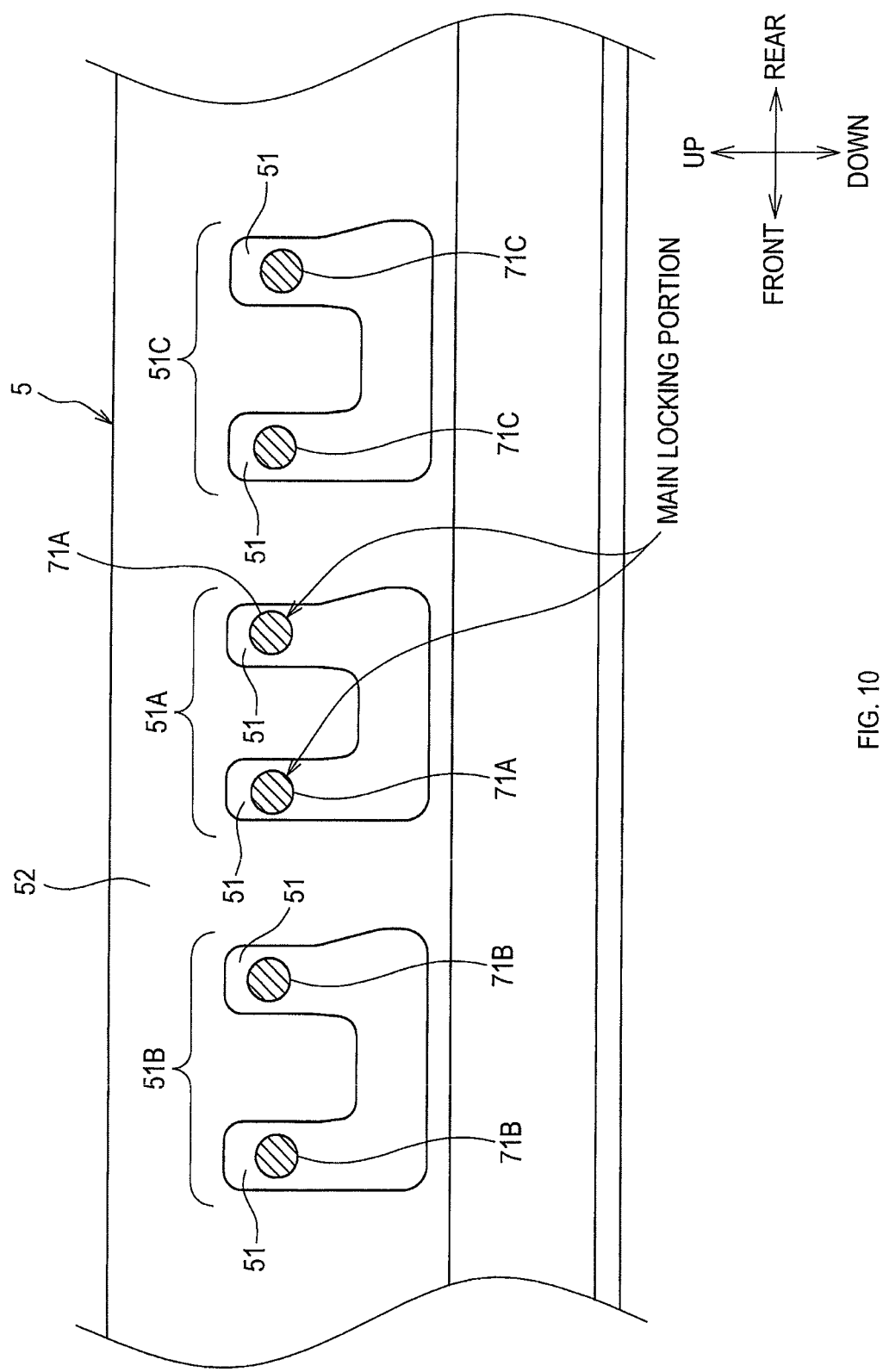
FIG. 10 is an enlarged view of through-holes in the movable rail.

The through-holes 51 is at least three in number and may be arranged in an aligned manner along the longitudinal axis. As shown in FIGS. 9 and 10, the present embodiment provides the plate 52 with six through-holes 51. Neighboring two through-holes 51 among the six through-holes 51 are used as a paired through-hole.

Hereinafter, the six through-holes 51 are defined in detail as follows: two through-holes that are located in a longitudinal middle part of the plate 52 are paired to be a first through-hole 51A; two through-holes that are located in an end (a seat-front side) in the longitudinal axis are paired to be a second through-hole 51B; and two through-holes that are located in another end (a seat-rear side) in the longitudinal axis are paired to be a third through-hole 51C.

It can be understood that each through-hole 51 has an elongated shape that extends along an axis (the up-down axis) that is parallel to the indentation axis of the indentations 31. Further, it can be understood that the two through-holes 51 that configure the first through hole 51A are continuous to each other in respective ends thereof in respective extension axes.

Similarly, it can be understood that the two through-holes 51 that configure the second through-hole 51B are continuous to each other in respective ends thereof in respective extension axes; and the two through-holes that configure the third through-hole 51C are continuous to each other in respective ends thereof in respective extension axes.

The extension axis (a major axis) of each through-hole 51 corresponds to an axis along which the lock portion 71 is displaced. At one end in the extension axis, the engagement between the lock portion 71 and the fixed rail 3, and the engagement between the lock portion 71 and the movable rail 5 is released. At the other end in the extension axis, the lock portion 71 is engaged with the fixed rail 3 and the movable rail 5.

<Lock Portion>

Figure 11:
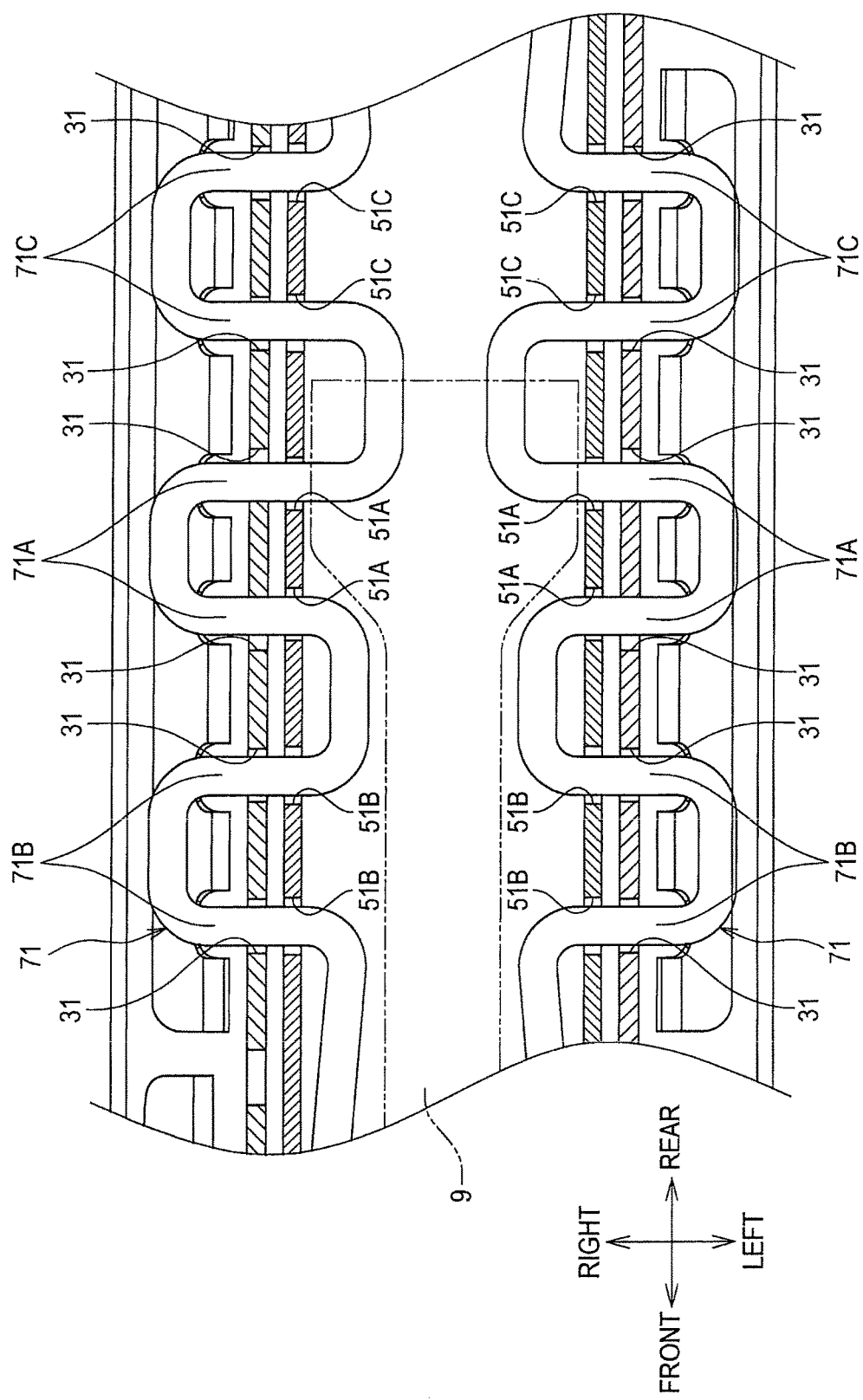
FIG. 11 is an explanatory diagram showing a locking state of the locking mechanism.

As shown in FIG. 11, the lock portion 71 comprises a first latch 71A, a second latch 71B, and a third latch 71C. The first latch 71A gets through the first through-hole 51A and gets through respective indentations 31.

The first through-hole 51A according to the present embodiment is the paired two through-holes 51 and the first latch 71A according to the present embodiment is a pair of paralleled legs. Similarly, the second latch 71B and the third latch 71C each is the pair of paralleled legs.

The first latch 71A is displaced along indentation axis of the indentation 31, thereby being displaceable between a locking position (see, FIG. 8) that provides engagements with respective indentations 31, and a non-locking position that is distanced from the locking position.

In other words, in the first through-hole 51A, the first latch 71A is displaceable between the other end (an upper end, in the present embodiment) in the extension axis, which is the locking position, and the one end (a lower end, in the present embodiment) in the extension axis, which is the non-locking position.

Similarly, the second latch 71B gets through the second through-hole 51B and gets through respective indentations 31. The second latch 71B is displaced along indentation axes, thereby being displaceable between the locking position and the non-locking position.

Similarly, the third latch 71C gets through the third through-hole 51C and gets through respective indentations 31. The third latch 71C is displaced along the indentation axes, thereby being displaceable between the locking position and the non-locking position.

As shown in FIG. 11, the lock portion 71 according to the present embodiment, specifically, the first latch 71A to the third latch 71C, are configured integrally as one piece with single linear material that is processed by bending into a series of square waves. Thus, the first latch 71A to the third latch 71C are displaced together between the locking position and the non-locking position. The linear material preferably has a solid cylindrical shape that has a circular section.

According to the above-described arrangements, the second through-hole 51B and the second latch 71B are respectively positioned in an end in the longitudinal axis respective distances from the first through-hole 51A and the first latch 71A. The third through-hole 51C and the third latch 71C are respectively positioned in another end in the longitudinal axis respective distances from the first through-hole 51A and the first latch 71A.

The first latch 71A serves as a main lock that withstands loads, in greater amount in comparison with the second latch 71B and the third latch 71C, in response to an external force (hereinafter referred to as a displacement force) that displaces the movable rail 5 along the longitudinal axis acting thereon while in the locking state.

Specifically, in absence of the displacement force acting on the movable rail 5, the following requirements (a) to (c) are satisfied.

(a) The first latch 71A abuts against inner wall surfaces of the respective indentations 31 or an inner wall surface of the first through-hole 51A.

(b) The second latch 71B is separated at least from inner wall surfaces of the respective indentations 31 or from an inner wall surface of the second through-hole 51B.

(c) The third latch 71C is separated at least from inner wall surfaces of the respective indentations 31 or an inner wall surface of the third through-hole 51C.

According to the requirement (a) of the present embodiment, the first latch 71A abuts against the inner wall surfaces of the respective indentations 31 (see, FIG. 8) while being separated from the inner wall surface of the first through-hole 51A (see, FIG. 10).

The paired legs that configure the first latch 71A abut against the inner surfaces of the respective indentations 31 so as to hold a portion 32A (see, FIG. 8) along the front-rear axis. The portion 32A is located in the plate 32 of the fixed rail 3 that is interposed between the paired legs that configure the first latch 71A.

According to the requirements (b) and (c) of the present embodiment, as shown in FIGS. 8 and 10, the second latch 71B is separated from the inner wall surfaces of the respective indentations 31 and from the inner wall surface of the second through-hole 51B. The third latch 71C is separated from the inner wall surfaces of the respective indentations 31 and from the inner wall surface of the third through-hole 51C.

3. Features of Seat Sliding Device of the Present Embodiment

As shown in FIG. 11, the first latch 71A to the third latch 71C of the present embodiment respectively get through the first through-hole 51A to the third through-hole 51C and get through the respective indentations 31, and thus the movable rail 5 is engaged with the fixed rail 3 via at least three portions. Thus, it is possible to enhance a lock strength.

The displacement force that is directed to slide the movable rail 5 is distributed to the first latch 71A to the third latch 71C, thus minimizing respective forces that act on the first through-hole 51A to the third through-hole 51C and on the indentations 31 in comparison with the force acting on the movable rail 5.

Thus, it is possible to reduce thicknesses of respective portions that configure the first through-hole 51A to the third through-hole 51C and the indentations 31 and thereby to reduce a weight of the seat sliding device 1.

In the present embodiment, the first latch 71A serves as the main lock that withstands loads, in the greater amount in comparison with the second latch 71B and the third latch 71C, in response to the displacement force acting on the movable rail 5 while in the locking state.

With such a configuration, the displacement force that acts on the movable rail 5 causes the first latch 71A to abut with pressure against the inner wall surfaces of the respective indentations 31 in a forcibly pushing manner. Hereinafter, portions against which the first latch 71A abuts with pressure are referred to as first pressure-abutting portions P1 (see, FIG. 8).

The first latch 71A and the movable rail 5 are slightly deformed, which causes the second latch 71B and the third latch 71C to have a moment about the first pressure abutting portions P1. The moment is induced in a direction that releases the second latch 71B and the third latch 71C from the respective indentations 31 (hereinafter referred to as the release moment).

The release moment therefore increases as respective distances increases between the first pressure-abutting portions and the second latch and further to the third latch. Accordingly, the second latch 71B or the third latch 71C may not exhibit a function thereof in response to the displacement force acting significantly on the movable rail 5, being unable to effectively enhance the lock strength.

In the present embodiment, however, the second through-hole 51B and the second latch 71B are respectively positioned in a seat-front side respective distances from the first through-hole 51A and the first latch 71A and the third through-hole 51C, and the third latch 71C are positioned in a seat-rear side respective distances from the first through-hole 51A and the first latch 71A.

With such a configuration, the distance between the first pressure-abutting portions P1 and the second latch 71B in the present embodiment is reduced in comparison with an example configuration where the second latch 71B and the third latch 71 C are together positioned in the seat-front side the respective distances from the first latch 71A.

Furthermore, the distance between the first pressure-abutting portions P1 and the third latch 71C in the present embodiment is reduced in comparison with an example configuration where the second latch 71B and the third latch 71C are together positioned in the seat-rear side the respective distances from the first latch 71A.

Thus, in the present embodiment, it is possible to reduce the release moment and thereby to effectively exhibit respective functions of all of the latches 71A, 71B, and 71C, ensuring to enhance the lock strength.

Further, when the first pressure-abutting portions P1 are forcingly pushed by the first latch 71A, which is the main lock in the present embodiment, the second latch 71B, for example, then abuts with pressure against the inner wall surfaces of the respective indentations 31 at abutting portions (hereinafter referred to as second pressure-abutting portions).

When the second pressure-abutting portions are forcingly pushed by the second latch 71B, the third latch 71C, for example, then abuts with pressure against the inner wall surfaces of the respective indentations 31 at abutting portions (hereinafter referred to as third pressure-abutting portions). In other words, in the present embodiment, the inner wall surfaces of the indentations 31 are forcingly pushed (failure), in the following order, at the first pressure-abutting portions, the second pressure-abutting portions, and the third pressure-abutting portions.

The first latch 71A abuts against the inner wall surfaces of the respective indentations 31, the second latch 71B is separated from the inner wall surfaces of the respective indentations 31 and from the inner wall surface of the second through-hole 51B, and the third latch 71C is separated from the inner wall surfaces of the respective indentations 31 and from the inner wall surface of the third through-hole 51C. This way, it is possible to ensure that the first latch 71A serves as the main lock.

According to the present embodiment, the first latch 71A, the second latch 71B, and the third latch 71C each is configured with the linear material that has a circular section. With such a configuration, the second latch 71B and the third latch 71C are easily released from the respective indentations 31 due to the release moment. In the present embodiment, however, it is unlikely that the second latch 71B and the third latch 71C are released from the respective indentations 31 due to the release moment.

The indentations 31 have respective widths W that flare toward respective opened-ends 31A of the respective indentations 31. With such a configuration, it is possible to easily guide the first latch 71A, the second latch 71B, and the third latch 71C into the respective indentations 31.

The release moment may be easily induced where the indentations 31 have the respective widths W that flare toward the respective opened-ends 31A of the respective indentations 31. In the present embodiment, however, it is unlikely that the second latch 71B and the third latch 71C are released from the respective indentations 31.

(Other Embodiments)

In the above embodiment, the first latch 71A abuts against the inner wall surfaces of the respective indentations 31 while being separated from the inner wall surface of the first through-hole 51A. However, the present disclosure is not limited hereto. For example, the first latch 71A may abut against the inner wall surfaces of the respective indentations 31 and the inner wall surface of the first through-hole 51A.

In the above embodiment, the paired legs that configure the first latch 71A abut against respective first pressure-abutting portions P1 so as to hold the portion 32A along the longitudinal axis (front-rear axis) (see, FIG. 8).

However, the present disclosure is not limited hereto. For example, at least one leg of the paired legs that configure the first latch 71A may abut against a portion in corresponding inner wall surface of corresponding indentation 31 that is located opposite to corresponding first pressure-abutting portions P1 in FIG. 8.

In the present embodiment, the second latch 71 is separated from the inner wall surfaces of the respective indentations 31 and from the inner wall surface of the second through-hole 51B. The third latch 71C is separated from the respective inner wall surfaces of the respective indentations 31 and from the inner wall surface of the third through-hole 51C.

However, the present disclosure is not limited hereto. For example, the second latch 71B may at least abut against the inner wall surfaces of the respective indentations 31 or the inner wall surface of the second through-hole 51B such that a pressure is substantially zero in abutting portions.

In this case, the second latch 71B may abut against respective seat-front side or seat-rear side inner wall surfaces of the respective indentations while being interposed therebetween, or against both sides of the inner wall surfaces of the respective indentations while being interposed therebetween; or the second latch 71B may abut against seat-front side or seat-rear-side inner wall surface of the second through-hole 51B while being interposed therebetween, or against both sides of the inner wall surface of the second through-hole 51B while being interposed therebetween. The same applies to the third latch 71C.

The indentations 31 of the above embodiment have the respective widths W that flare toward the respective opened-ends 31A of the respective indentations 31. However, the present disclosure is not limited hereto.

The first latch 71A to the third latch 71C of the above embodiment are configured with respective paired legs. However, the present disclosure is not limited hereto. Specifically, for example, each of the first latch 71A to the third latch 71C may be a single leg.

The lock spring 7 of the above embodiment is bilaterally symmetric and thus the first latch 71A to the third latch 71C are arranged in each side of the lock spring 7. However, the present disclosure is not limited hereto.

In the above embodiment, the first latch 71A, the second latch 71B, and the third latch 71C each is configured with the linear material that has the circular section. However, the present disclosure is not limited hereto.

In the above embodiment, the seat sliding device of the present disclosure is used for seats for automobile, railroad vehicles, ships, boats, and aircrafts. However, the present disclosure is not limited hereto. For example, the present disclosure may be applied for built-in seats, such as seats used in theaters.

Furthermore, the present disclosure may be performed by combining at least two embodiments among the above embodiments.

What is claimed is:

1. A seat sliding device that supports a seat in a slidable manner, the seat sliding device comprising:

a fixed rail that comprises indentations that are each indented along a respective one of a plurality of indentation axis, wherein the plurality of indentation axis is indented in a direction that is substantially perpendicular to a longitudinal axis of the fixed rail, wherein the indentations are arranged in an aligned manner along the longitudinal axis;

a movable rail that is slidable with respect to the fixed rail while supporting the seat, wherein the movable rail comprises through-holes that extend through the movable rail along an axis substantially perpendicular to the plurality of indentation axis and the longitudinal axis; and the through-holes are arranged in an aligned manner along the longitudinal axis;

a first latch that gets through a first through-hole among the through-holes and gets through respective indentations among the indentations, wherein the first latch is displaced along the indentation axes, thereby being displaceable between a locking position that provides engagements with the respective indentations and a non-locking position that is distanced from the locking position;

a second latch that gets through a second through-hole among the through-holes and gets through respective indentations among the indentations, wherein the second latch is displaced along the indentation axes, thereby being displaceable between the locking position that provides engagements with the respective indentations and the non-locking position that is distanced from the locking position; and a third latch that gets through a third through-hole among the through-holes and gets through respective indentations among the respective indentations, wherein the third latch is displaced along the indentation axes, thereby being displaceable between the locking position that provides engagements with the respective indentations and the non-locking position that is distanced from the locking position, wherein the first latch serves as a main lock that withstands loads, in greater amount in comparison with the second latch and the third latch, in response to an external force that displaces the movable rail along the longitudinal axis acting on the movable rail while in a locking state, and wherein the second through-hole and the second latch are respectively positioned in an end side along the longitudinal axis respective distances from the first through-hole and the first latch, and the third through-hole and the third latch are respectively positioned in another end side along the longitudinal axis respective distances from the first through-hole and the first latch.

2. The seat sliding device according to claim 1, wherein, in absence of the external force acting on the movable rail in the locking state, the first latch abuts against inner wall surfaces of the respective indentations or an inner wall surface of the first through-hole, wherein the second latch is separated at least from inner wall surfaces of the respective indentations or an inner wall surface of the second through-hole, and wherein the third latch is separated at least from inner wall surfaces of the respective indentations or an inner wall surface of the third through-hole.

3. The seat sliding device according to claim 1, wherein, in absence of the external force acting on the movable rail in the locking state, the first latch abuts at least against inner wall surfaces of the respective indentations, wherein the second latch is separated from the inner wall surfaces of the respective indentations and from the inner wall surface of the second through-hole, and wherein the third latch is separated from the inner wall surfaces of the respective indentations and from the inner wall surface of the third through-hole.

4. The seat sliding device according to claim 1, wherein the first latch, the second latch, and the third latch each is configured with a linear material having a circular section.

5. The seat sliding device according to claim 1, wherein the first latch, the second latch, and the third latch are configured integrally as one piece with single linear material that is processed into a series of square waves.

6. The seat sliding device according to claim 1, wherein the indentations have respective widths that flare toward respective opened-ends of the indentations.

\* \* \* \* \*